INVENTOR
GEORGE ABRAHAM

BY [signature]
ATTORNEY

United States Patent Office 3,328,605

Patented June 27, 1967

3,328,605

MULTIPLE AVALANCHE DEVICE

George Abraham, 3107 Westover Drive SE., Washington, D.C. 20020

Filed Sept. 30, 1964, Ser. No. 400,615

2 Claims. (Cl. 307—88.5)

The invention described herewith may be manufactured and used by or for the Government of the United States of America for governmental purposes without the payment of any royalties thereon or therefor.

The present invention relates to semiconductor devices and more particularly to multistable semiconductor devices exhibiting a composite negative resistance characteristic.

Microminiturization of electronic circuitry provides well known advantages of small size and high reliability. Large systems with a multitude of repetitive circuitry readily lend themselves to this miniturization process. When the repetitive nature of fabrication is limited, the cost of this fabrication process may prove to be prohibitive. Other methods of miniturization, therefore, must be developed which provide the advantages of this process without adding the attendant cost of initial fabrication.

The present invention offers a unique method of miniturization whereby both small size and relatively low fabrication costs are realized. A multijunction semiconductor device, such as the transistor, which in normal switching operation represents a bistable device, may be utilized as a tristable device by the alteration of operating parameters. By causing each p-n junction of a multijunction semiconductor device to generate a negative resistance characteristic and by the combination of these characteristics into a composite multistable characteristics, a small number of these devices are available to perform the functions formerly performed by a multitude of devices.

It is accordingly an object of the present invention to provide tristable operation with a single transistor.

It is another object of the present invention to provide a composite negative resistance characteristic due to double avalanche breakdown in a transistor.

It is a further object of the present invention to provide $x+1$ stable states of operation in a semiconductor device having $x$ p-n junctions.

Other objects and advantages of the invention will become more fully apparent and better understood from the following description of a preferred embodiment of the invention, as illustrated in the accompanying drawings, in which.

Figure 1:
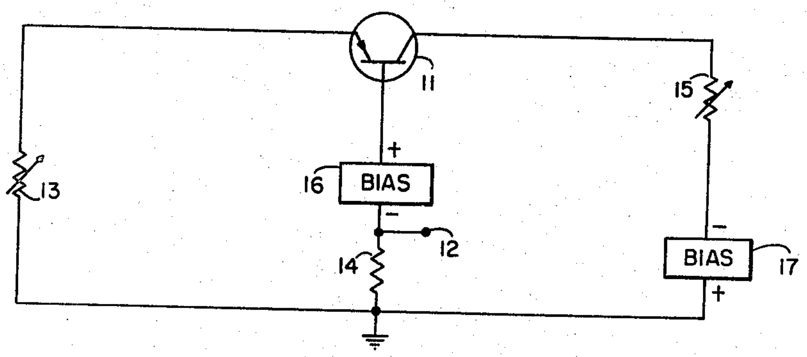
FIG. 1 illustrates the preferred embodiment of the present invention.

Referring now to FIG. 1, there is shown a transistor 11 having its collector-base and emitter base junctions reverse-biased by bias sources 17 and 16, respectively. Bias source 16 is shown coupled across the emitter-base junction by variable resistor 13 and fixed resistor 14. The collector is biased in opposition to its polarity, e.g. negative with respect to the base, by bias source 17 connected as shown, with the negative side of the source being coupled to the collector by variable resistor 15, while the positive side of this source is connected to ground. The negative resistance characteristic caused to be generated in the diodes formed by the interacting emitter and base regions and the collector and base regions, as will be hereinafter described, may be observed across base resistor 14. Terminal 12, the output terminal, is provided for such a purpose.

Figure 3:
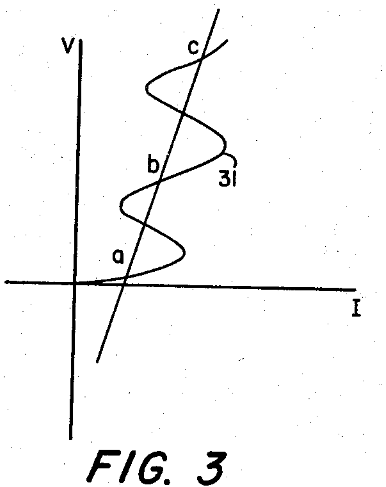
FIG. 3 shows the composite negative resistance characteristic of the embodiment of FIG. 1.

The circuit shown in this figure provides the static characteristic shown in FIG. 3. Here, bias source 16 is connected in the base circuit where the degree of control over the bias is more easily observed for demonstration purposes. In actual operation, however, this bias source would be placed in the emitter circuit such that the negative terminal of this source is coupled to the emitter by variable resistor 13. In this latter configuration the circuit is symmetrical and more readily used in practical operation. FIG. 1 shows bias source 16 in the base circuit, however, as this is the configuration used to generate curve 31, as shown in FIG. 3.

It should be readily understood that the choice of pnp transistor in the embodiment of FIG. 1 is by way of illustration only and an npn transistor is equally suitable.

Figure 2:
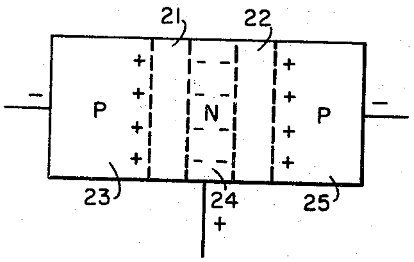
FIG. 2 illustrates the internal phenomenon utilized in the semiconductor device of the present invention.

The operation of the present invention can be readily understood from the pictorial showing of the internal device phenomenon in FIG. 2. Here is shown an n-doped slab of semiconductor material 24 about which is sandwiched two sections of p-doped semiconductor material, regions 23 and 25. As shown in the figure, regions 23 and 25 are biased negatively, in opposition to the polarity of these regions, while region 24 is positively biased. The p-n junctions formed by regions 23 and 25 with region 24 are thus reverse biased. With the bias applied the transition regions of these junctions, commonly called depletion regions, become enlarged. These depletion regions 21 and 22 are shown by dashed lines with the donor and acceptor atoms of the n and p sections of the semiconductor aligned along these lines. As the bias is increased the depletion regions widen, effectively reducing the width of center region 24, until the separation between the depletion regions is less than the diffusion length of the minority carriers in regions 23 and 25 and interaction between the two p-n junctions is made possible. As the reverse field is increased beyond the critical breakdown voltage of the particular semiconductor, hole-electron pairs thermally generated in the depletion regions will be separated and attracted by the field, hole into the p region and electron into the n region, causing multiple collisons to result in current multiplication and subsequent avalanche breakdown. Due to the reduced effective width of the center region, holes generated in depletion region 21 are easily pulled across the center region into p region 25. Holes generated in region 22 are likewise caused to traverse the center region into p region 23. There is thus an added source of minority carriers for each of the p-type regions enhancing breakdown and causing internal regeneration. This combined effect alters the breakdown characteristic exhibited by each p-n junction until negative resistance occurs.

To observe the double negative resistance characteristics generated by the phenomenon described, a resistor is connected in the lead to the center region, such as resistor 14 connected to the base of transistor 11, as shown in FIG. 1. By adjustment of resistors 13 and 15, in the circuit of this figure, it is possible to alter the currents through the device until the individual characteristics are combined in a composite characteristic, as shown in FIG. 3.

FIG. 3 shows the composite negative resistance characteristic generated in a two p-n junction semiconductor device, such as the transistor. With a load to the semiconductor device of such value to have its load line transect curve 31, three stable states, *a*, *b* and *c* and tristable operation is realized.

While the preferred embodiment of the present invention has been shown to incorporate a transistor as the active device, the phenomenon of a composite negative resistance characteristic described is readily obtained from semiconductor devices having a far greater number of junctions than this two junction device. The phenomenon is readily observable in both diffused junction semiconductor devices and planar types, as well as those of the point contact variety. In addition, vacuum deposited thin film semiconductors are readily adapted to be utilized within the instruction of the present invention. The only limitation is that the distance between those pairs of regions sandwiching the base or central region be less than the diffusion length of the minority charge carriers of these regions.

The preferred embodiment shown in FIG. 1, as previously explained, is used to exhibit and explain the multiple avalanche negative resistance phenomenon of the present invention. This circuit is readily adapted for a variety of uses where a multistable device is desired.

Used for multistable switching, a coupling capacitor or diode is connected to the emitter of transistor 11, and a source of positive pulses of the proper magnitude is applied. Each successive pulse causes switching to another stable state on the characteristic curve.

If desired, capacitors or tuned circuits could be connected across the emitter-base and collector-base junctions to obtain a multiple level multiple frequency oscillator with proper choice of load lines.

Since various changes and modifications may be made in the practice of the invention herein described without departing from the spirit or scope thereof, it is intended that the foregoing description shall be taken primarily by way of illustration and not in limitation except as may be required by the appended claims.

What is claimed and desired to be secured by Letters Patent of the United States is:

1. A circuit comprising:
a semi-conducting device having a first region of one conductivity type and a plurality of regions of opposite conductivity type forming X number of P-N junctions with said first region;
means for continually reverse biasing each of said junctions to create a depletion region at each junction;
said biasing means being of sufficient magnitude to reduce the effective width of said first region until separation between the depletion regions is less than the diffusion length of minority charge carriers in said plurality of regions and to provide said device with a current-voltage characteristic having $X+1$ stable states of operation; and
adjustable current-limiting means coupling said biasing means across each of said junctions such that the bias applied to said semi-conductor device is selectively controlled.

2. A circuit comprising:
a semi-conductor having a plurality of doped regions, one region of which being oppositely doped from the other of said regions;
said other regions abutting said one region to form X number of P-N junctions;
means for continuously reverse biasing each of said junctions to create a depletion region at each junction and operative to reduce the effective dimensions of said one region until separation between predetermined pairs of depletion regions is less than the diffusion length of minority charge carriers in said other regions;
said biasing means providing $X+1$ stable states of operation for said semi-conductor; and
adjustable current-limiting means coupling said biasing means across each of said junctions.

References Cited

UNITED STATES PATENTS

| | | | |
|---|---|---|---|
| 2,629,833 | 2/1953 | Trent | 317—235 X |
| 2,764,642 | 9/1956 | Shockley | 317—235 X |
| 2,927,222 | 3/1960 | Turner | 307—88.5 |
| 2,939,965 | 7/1960 | Abraham | 307—88.5 |
| 2,989,713 | 6/1961 | Warner | 317—235 |
| 3,054,912 | 9/1962 | Strull et al. | 307—88.5 |
| 3,098,160 | 7/1963 | Noyce | 307—88.5 |
| 3,142,020 | 7/1964 | Thuy | 317—235 X |
| 3,184,602 | 5/1965 | Abraham | 317—235 X |
| 3,187,193 | 6/1965 | Rappaport et al. | 317—234 |
| 3,196,329 | 7/1965 | Cook et al. | 317—234 |
| 3,200,266 | 8/1965 | Abraham | 307—88.5 |

FOREIGN PATENTS

| | | |
|---|---|---|
| 814,185 | 6/1959 | Great Britain. |

JOHN W. HUCKERT, *Primary Examiner.*

A. M. LESNIAK, *Assistant Examiner.*